United States Patent
Cheong et al.

(10) Patent No.: US 8,246,187 B2
(45) Date of Patent: Aug. 21, 2012

(54) DISPLAY DEVICE USING DIFFUSIVE LIGHT GUIDE PLATE

(75) Inventors: Byoung-Ho Cheong, Yongin-si (KR); Guk-Hyun Kim, Yongin-si (KR); Oleg Prudnikov, Suwon-si (KR); Seung-Won Park, Seoul (KR); Hyun-Jin Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 247 days.

(21) Appl. No.: 12/819,592

(22) Filed: Jun. 21, 2010

(65) Prior Publication Data
US 2011/0128721 A1    Jun. 2, 2011

(30) Foreign Application Priority Data
Dec. 1, 2009  (KR) ................. 10-2009-0117840

(51) Int. Cl.
G09F 13/04    (2006.01)
(52) U.S. Cl. ....... 362/97.1; 362/97.3; 362/612; 362/613
(58) Field of Classification Search .................. 362/612, 362/613, 97.1, 97.3
See application file for complete search history.

(56) References Cited

U.S. PATENT DOCUMENTS

| | | | |
|---|---|---|---|
| 7,850,339 B2* | 12/2010 | Wadia et al. | 362/241 |
| 2007/0121340 A1* | 5/2007 | Hoshi | 362/600 |
| 2008/0278818 A1* | 11/2008 | Chang | 359/599 |
| 2010/0079980 A1* | 4/2010 | Sakai | 362/97.1 |

FOREIGN PATENT DOCUMENTS

| | | |
|---|---|---|
| JP | 2007-227286 A | 9/2007 |
| KR | 1020040083891 A | 10/2004 |
| KR | 1020070048888 A | 5/2007 |

* cited by examiner

*Primary Examiner* — Evan Dzierzynski
(74) *Attorney, Agent, or Firm* — Cantor Colburn LLP

(57) ABSTRACT

A backlight unit includes a light source substrate on which a light source is mounted, a first light source plate which is disposed on the light source substrate and includes a cylindrical aperture corresponding to the light source, and a second light source plate which is disposed on the first light source plate and includes a partial transmission pattern on a bottom surface thereof. The partial transmission pattern corresponds to the aperture and allows part of light emitted from the light source to pass therethrough.

19 Claims, 7 Drawing Sheets

DISPLAY DEVICE USING DIFFUSIVE LIGHT GUIDE PLATE

This application claims priority to Korean Patent Application No. 10-2009-0117840 filed on Dec. 1, 2009, and all the benefits accruing therefrom under 35 U.S.C. §119, the disclosure of which is incorporated herein by reference in its entirety.

BACKGROUND OF THE INVENTION

1. Field of the Invention

The invention relates to a display device, and more particularly, to a display device including a backlight unit which uses light-emitting diodes as light sources.

2. Description of the Related Art

Liquid crystal displays ("LCDs") are one of the most widely used types of flat panel displays. Generally, an LCD includes a pair of substrates having electrodes and a liquid crystal layer interposed between the substrates. In an LCD, voltages are applied to electrodes to generate an electric field. The electric field determines the alignment of liquid crystal molecules of a liquid crystal layer, thereby controlling the amount of light that passes through the liquid crystal layer. As a result, a desired image is displayed on the LCD.

Since LCDs are passive light-emitting devices, they require a backlight assembly unit which provides light that passes through a liquid crystal layer. Examples of light sources used in a backlight assembly include cold cathode fluorescent lamps ("CCFLs") and external electrode fluorescent lamps ("EEFLs").

In LCDs, light-emitting diodes ("LEDs") have been widely used as light sources for a backlight assembly due to their superior color reproducibility and lower power consumption.

Backlight units are classified into direct-type backlight units and edge-type backlight units according to the position of light sources. In edge-type backlight units, a light source is disposed on a side surface of a light guide plate ("LGP"). Edge-type backlight units are applied mainly in relatively small LCDs such as laptop and desktop computers. Edge-type backlight units have superior light uniformity, have a long useful life, and enable LCDs to be thinner. However, edge-type backlight units have low optical efficiency since light emitted from a light source is lost as it passes through an LGP. In addition, in the case of large LCD panels, an LGP cannot be manufactured using a single frame.

As LCDs become larger, the development of backlight units has been focused on direct-type backlight units. In direct-type backlight units, one or more light sources are disposed under an LCD panel to provide light to the entire surface of the LCD panel. Since one or more light sources included in a direct-type backlight unit are disposed under an LCD panel, bright lines may easily be formed due to non-uniform luminance.

BRIEF SUMMARY OF THE INVENTION

Exemplary embodiments of the invention provide a backlight unit with improved luminance uniformity and a display device using the backlight unit.

However, the invention is not restricted to the exemplary embodiments set forth herein. The above and other features of the invention will become more apparent to one of ordinary skill in the art to which the invention pertains by referencing the detailed description of the invention given below.

According to an exemplary embodiment of the invention, there is provided a backlight unit including a light source substrate on which a light source is mounted, a first light source plate which is disposed on the light source substrate and includes a cylindrical aperture corresponding to the light source, and a second light source plate which is disposed on the first light source plate and includes a partial transmission pattern on a bottom surface thereof. The partial transmission pattern corresponds to the aperture and allows part of light emitted from the light source to pass therethrough.

According to an exemplary embodiment of the invention, there is provided a display device including a display panel which displays images and a backlight unit which is disposed under the display panel and provides light to the display panel. The backlight unit includes a light source substrate on which a plurality of a light source is mounted, a first light source plate which is disposed on the light source substrate and includes a plurality of a cylindrical aperture corresponding respectively to the light sources, and a second light source plate which is disposed on the first light source plate and includes a plurality of a partial transmission pattern on a bottom surface thereof. The partial transmission patterns correspond respectively to the apertures and allow part of light emitted from the light sources to pass therethrough. A top surface of the first light source plate contacts the second light source plate, excluding portions thereof which correspond respectively to the partial transmission patterns respectively covering the apertures.

BRIEF DESCRIPTION OF THE DRAWINGS

The above and other features of the invention will become more apparent by describing in detail exemplary embodiments thereof with reference to the attached drawings, in which.

DETAILED DESCRIPTION OF THE INVENTION

Figure 1:
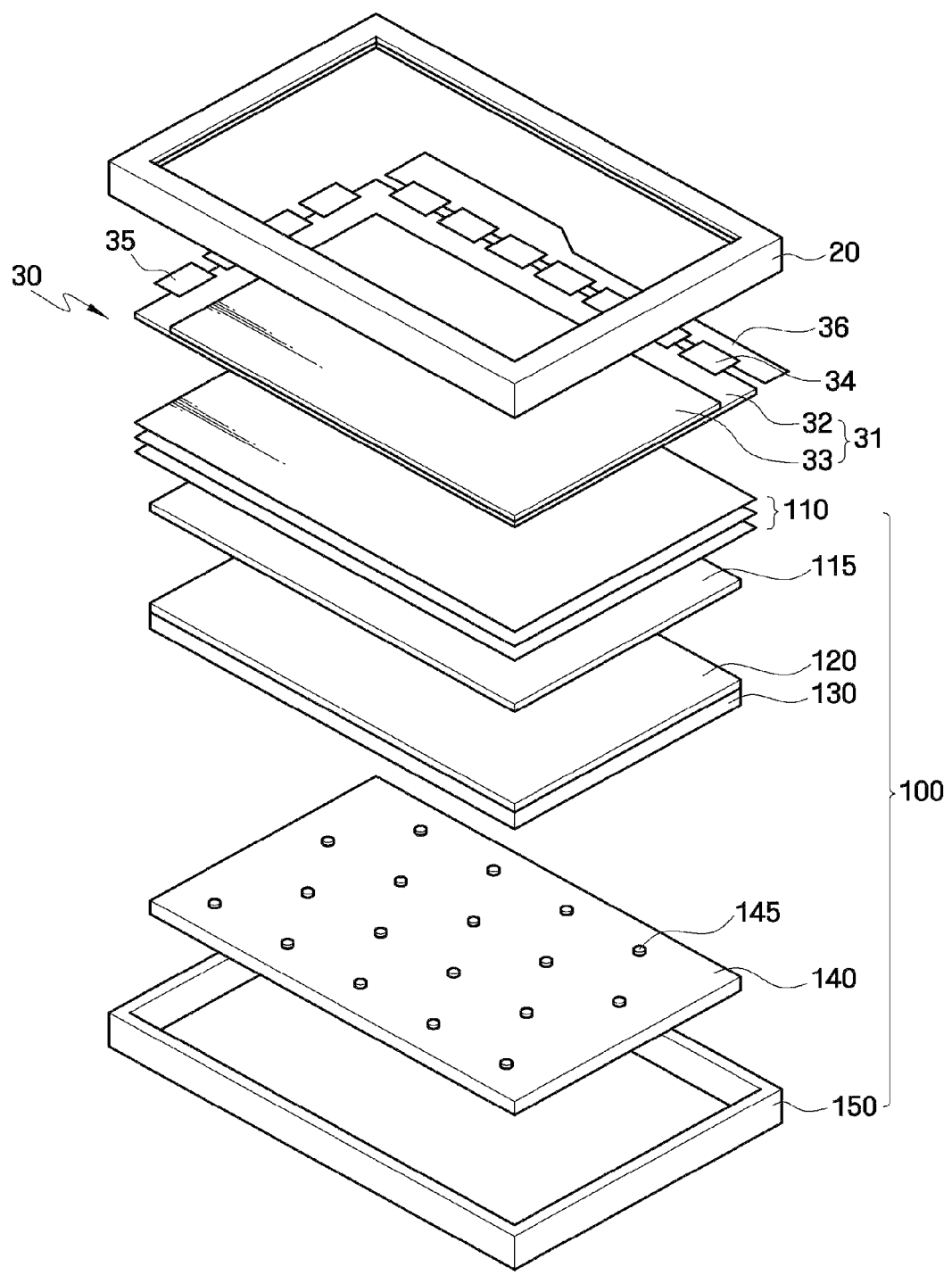
FIG. 1 is an exploded perspective view of an exemplary embodiment of a display device, according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. In the drawings, sizes and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like reference numerals refer to like elements throughout the specification. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

Embodiments of the invention are described herein with reference to (plan and) cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the elements illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

A display device according to an exemplary embodiment of the invention will be described in detail with reference to FIGS. 1 through 5.

Figure 2A:
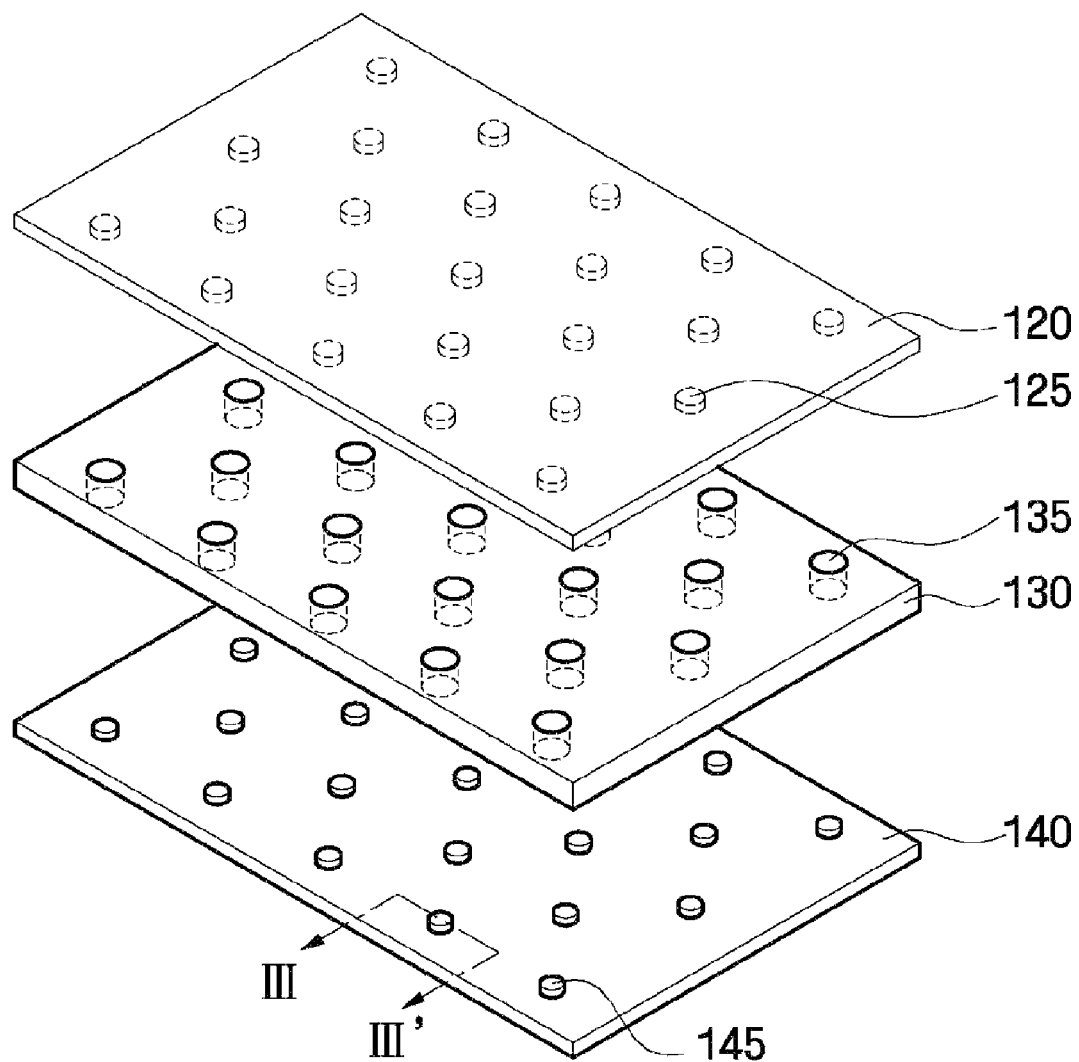
FIGS. 2A and 2B are respectively an exploded perspective view and an enlarged portion of an exemplary embodiment of a backlight unit shown in FIG. 1.
Figure 2B:
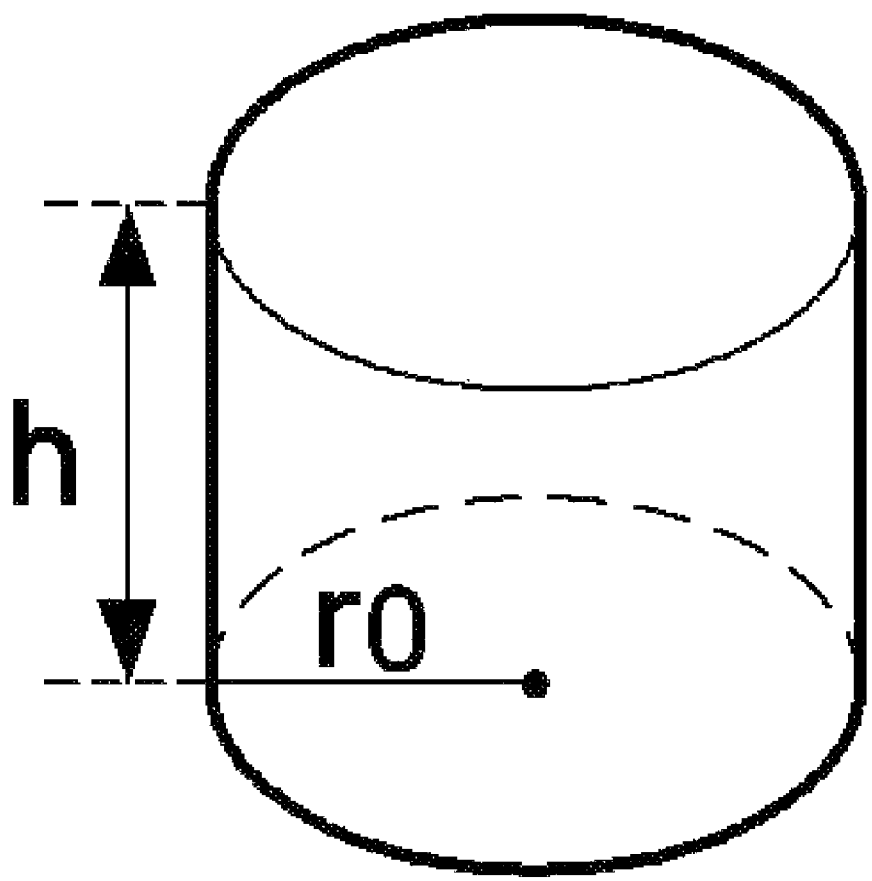
Figure 3:
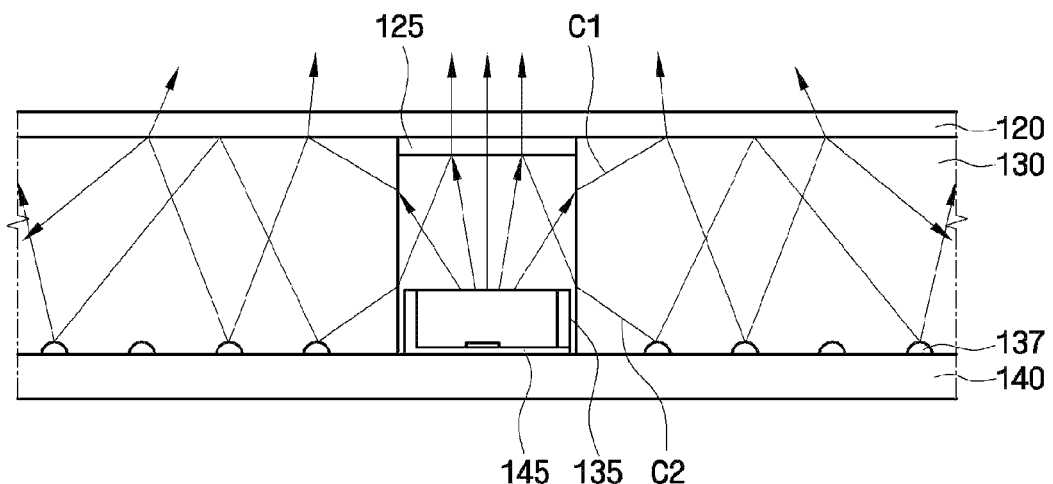
FIG. 3 is a cross-sectional view of the backlight unit shown in FIG. 1.
Figure 4:
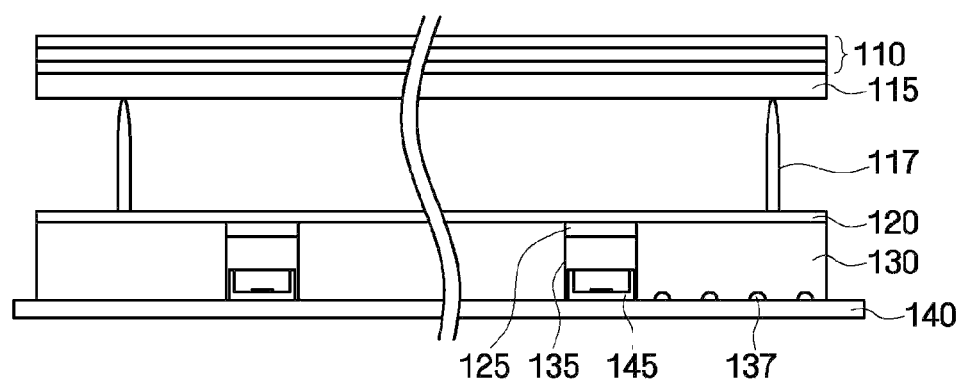
FIGS. 4 and 5 are views for explaining exemplary embodiments of an optical sheet disposed in the backlight unit of FIG. 1.
Figure 5:
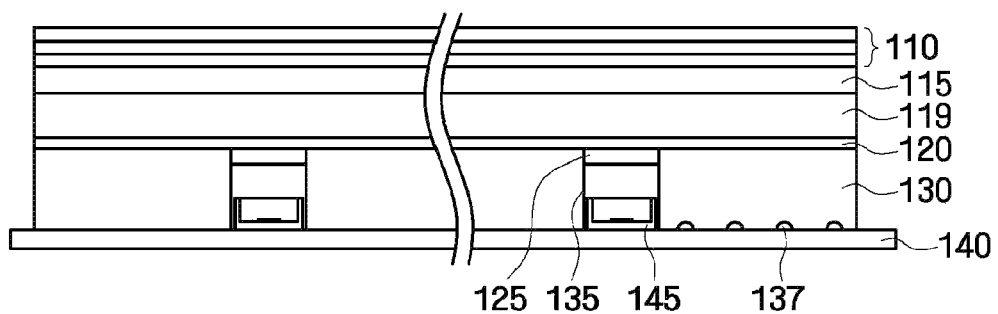

FIG. 1 is an exploded perspective view of an exemplary embodiment of a display device, according to the invention. FIGS. 2A and 2B are respectively an exploded perspective view and an enlarged portion of an exemplary embodiment of a backlight unit shown in FIG. 1. FIG. 3 is a cross-sectional view of the backlight unit shown in FIG. 1. For simplicity, diffusion patterns 137 shown in FIG. 3 are not illustrated in FIGS. 1, 2A and 2B. However, the invention is not limited thereto. FIGS. 4 and 5 are views for explaining exemplary embodiments of an optical sheet disposed in the backlight unit of FIG. 1.

Referring to FIGS. 1 through 3, a display panel assembly 30 may include a display panel 31, which includes a lower display panel 32 and an upper display panel 33, liquid crystals (not shown), a gate chip film package 35, a data chip film package 34, and a printed circuit board ("PCB") 36. The display panel assembly 30 may include a plurality of the gate chip film package 35 and/or a plurality of the data chip film package 34.

The display panel 31 includes the lower display panel 32, and the upper display panel 33 which faces the lower display panel 32. The lower display panel 32 includes a gate line (not shown), a data line (not shown), a thin-film transistor ("TFT") array, and a pixel electrode. The upper display panel 33 includes a color filter, a black matrix, and a common electrode. The lower display panel 32 may include a plurality of the gate line, the data line and/or the pixel electrode. The upper display panel 33 may include a plurality of the color filter, the black matrix and/or the common electrode.

In the illustrated embodiment of FIG. 1, the gate chip film packages 35 are connected to the gate lines (not shown) disposed on the lower display panel 32, and the data chip film packages 34 are connected to the data lines (not shown) disposed on the lower display panel 32. The gate chip film packages 35 and the data chip film packages 34 may respectively receive gate-driving signals and data-driving signals from the PCB 36, and deliver the received gate-driving signals and the received data-driving signals to the gate lines and the data lines. In an alternative exemplary embodiment of the invention, the display panel assembly 30 may not include the gate chip film packages 35. Instead, a gate driver (not shown) including amorphous silicon may be mounted directly on the lower display panel 32.

An upper housing 20 forms an exterior surface (e.g., uppermost surface) of the display device and includes a receiving space in which the display panel assembly 30 and a backlight unit 100 are accommodated. An open window is disposed in the center of the upper housing 20 to expose an upper surface of the display panel 31 to a viewing side of the display device. The upper housing 20 is coupled to a lower housing 150.

The backlight assembly 100 includes a light source substrate 140, a first light source plate 130, a second light source plate 120, and an optical sheet 110. The backlight assembly 100 may include a plurality of the optical sheet, collectively indicated 110 in FIGS. 1, 4 and 5.

One or more of a light source 145 which emits light, is mounted on the light source substrate 140. In the illustrated embodiment of FIG. 1, the light source substrate 140 supplies power to a plurality of the light source 145. Light emitted from the light sources 145 is provided to the display panel assembly 30 via (e.g. after passing through) the first and second light source plates 130 and 120. The light source substrate 140, the first light source plate 130 and the second light source plate 120 are each a single unitary indivisible member.

The light sources 145 may be light-emitting elements which emit light, such as point light sources which include light-emitting diodes ("LEDs"). LEDs have superior color reproducibility and low power consumption. In an exemplary embodiment, an LED may include a frame (not shown) and red, green, and blue light-emitting chips (not shown) mounted in the frame. The LED may emit white light resulting from the mixing of red light, green light, and blue light emitted respectively from the red, green, and blue light-emitting chips. Alternatively, the LED may emit white light due to phosphors (not shown) disposed on a light-emitting chip (not shown) which emits at least one of red light, green light, and blue light or emits light outside the visible light spectrum. The light sources 145 may be a group of LEDs respectively emitting red light, green light, and blue light which are mixed with each other to produce white light. The light sources 145 are not limited to LEDs, but may include various light-emitting elements.

In an exemplary embodiment, the light source substrate 140 may include a PCB to connect the light sources 145 to an external power source (not shown). Accordingly, the light sources 145 mounted on the light source substrate 140 may be physically and/or electrically connected to each other. In an alternative embodiment, a reflective member may be disposed on a surface of the light source substrate 140 on which the light sources 145 are mounted, in order to enhance the use efficiency of light emitted from the light sources 145.

The first light source plate 130 is disposed directly on and overlapping the light source substrate 140, in a plan view of the display device. Together with the second light source plate 120, the first light source plate 130 converts light emitted from the light sources 145 into surface light and uniformly delivers the surface light to the display panel assembly 30. The first light source plate 130 includes a plurality of an aperture 135 (FIGS. 2A and 2B) which correspond to and align with respectively to the light sources 145, and in which the light sources 145 are respectively housed. As used herein, correspond indicates being substantially similar in dimension, position (e.g., aligned) and/or quantity, relative to another feature or element.

In the illustrated exemplary embodiment, the aperture 135 may completely penetrate through a thickness of the first light source plate 130, and may be substantially shaped like a cylinder with a predetermined radius $r_0$ and a predetermined height h. As the aperture 135 penetrates completely through the thickness of the first light source plate 130, the aperture is considered an enclosed opening and the first light source plate 130 solely defines the aperture 135.

A diameter $2r_0$ of the aperture 135 may be determined by a size of the light source 145. In one exemplary embodiment, the diameter $2r_0$ of the aperture 135 may be substantially equal to the size (e.g., a diameter) of the light source 145. In addition, the height h of the aperture 135 may be substantially equal to a height of the first light source plate 130. Here, the height (e.g., the thickness) of the first light source plate 130 may be determined to be a height that is large enough for uniform luminance distribution of light, and is small enough to make the backlight unit 100 slimmer in an overall thickness of the display device. In particular, in the illustrated exemplary embodiment, a ratio ($\eta = h/r_0$) of the height h of the aperture 135 to the radius $r_0$ thereof, may be 1.5 or higher, preferably, 2 or higher. This ratio will be described in detail later with reference to FIGS. 8A through 9.

The first light source plate 130 including a plurality of the aperture 135 may include a transparent plastic material, and may be formed by using a machining, injection molding, or die-casting method. In one exemplary embodiment, the first light source plate 130 may include polymethylmethacrylate ("PMMA"), which has a high transmittance and is not easily deformed or broken due to its high strength, and may be formed by using the machining, injection molding, or die-casting method. The material of the first light source plate 130 is not limited to the above material. The first light source plate 130 may include various transparent materials having a different refractive index from air.

A diffusion pattern 137 is disposed in a bottom surface of the first light source plate 130 which faces the light source substrate 140. A plurality of the diffusion pattern 137 may be disposed protruding from the bottom surface of the first light source plate 130 and extending into an interior of the first light source plate 130. Of light emitted from the light sources 145, light, which returns to the light source substrate 140 after failing to proceed to the display panel assembly 30, is diffused (or reflected) by the diffusion patterns 137.

The diffusion pattern 137 may include a white material with a high reflectivity, such as $TiO_2$, $BaSO_4$, $SiO_2$, or a combination of the same. In one exemplary embodiment, the diffusion pattern 137 may include a metal such as silver or aluminum. However, the material of the diffusion pattern 137 is not limited to the above examples. It can be understood by those of ordinary skill in the art that the diffusion pattern 137 may include various materials which can diffuse light returning to the light source substrate 140.

In the drawings, a plurality of the diffusion pattern 137 is disposed in the bottom surface of the first light source plate 130. However, the diffusion patterns 137 may not necessarily be disposed in the bottom surface of the first light source plate 130. In an alternative exemplary embodiment of the invention, a diffusion film may be disposed, instead of the diffusion patterns 137, on a lower surface of the first light source plate 130. Specifically, a white diffusion film having a high reflectivity may be disposed on an entire of the lower surface of the first light source plate 130 to diffuse light, which returns to the light source substrate 140 after failing to proceed to the display panel assembly 30, among light emitted from the light sources 145.

The second light source plate 120 is disposed on and overlapping an upper surface of the first light source plate 130, in the plan view of the display device. The second light source plate 120 includes a plurality of a partial transmission pattern 125 which corresponds (e.g., align) respectively to the apertures 135. The partial transmission pattern 125 and a plate portion of the second light source plate 120, collectively form the single unitary indivisible second light source plate 120. Like the first light source plate 130, the second light source plate 120 may include a plate including a transparent material. The second light source plate 120 may allow about 95% to about 98% of incident light to pass therethrough. The second light source plate 120 has a different refractive index from the first light source plate 130. Thus, the second light source plate 120 may reflect part of light, which is received from the first light source plate 130, to the first light source plate 130.

The partial transmission pattern 125 may be disposed on the second light source plate 120, and may have a substantially same diameter as the aperture 135 disposed in the first light source plate 130. Each of the partial transmission pattern 125 may be disposed protruding from a bottom surface of the second light source plate 120 and extending outwards to an exterior of the second light source plate 120. When the second light source plate 120 is aligned with and disposed on the first light source plate 130, the partial transmission pattern 125 is disposed in an internal area of the aperture 135 of the second light source plate 130. A lower surface of the partial transmission pattern 125 is disposed facing the light source and disposed at a distance away from an upper surface of the light source 145 also disposed in the aperture 135 of second transmission plate 130.

Accordingly, when the second light source plate 120 is aligned with and disposed on the first light source plate 130, the partial transmission patterns 125 may respectively cover the apertures 135 of the first light source plate 130, in the plan view of the display device. In addition, respective lower and upper surfaces of the first and second light source plates 130 and 120 may contact each other, excluding portions thereof which correspond respectively to the apertures 135 and the partial transmission patterns 125.

While the partial transmission pattern 125 has the substantially same diameter as the aperture 135 in the drawings, the invention is not limited thereto. In an alternative exemplary embodiment of the invention, the partial transmission pattern 125 may have a larger diameter than the aperture 135. That is, if the partial transmission pattern 125 has a smaller diameter than the aperture 135, leakage of light may occur. Thus, the diameter of the partial transmission pattern 125 should be equal to or larger than that of the apertures 135.

The partial transmission patterns 125 allow a portion of light received from the light sources 145 to pass therethrough while reflecting the other portion of the light. Specifically, the partial transmission patterns 125 allow approximately 5% to 10% of light perpendicularly incident thereon to pass therethrough and reflect approximately 90% to 95% of the light. If the partial transmission patterns 125 allow more than approximately 10% of the light to pass therethrough, areas above the light sources 145 may become noticeably bright, thereby forming luminance stains. On the other hand, if the partial transmission patterns 125 allow less than approximately 5% of the light to pass therethrough, the areas above the light sources 145 may become noticeably dark, thereby forming luminance stains.

In an exemplary embodiment, the partial transmission patterns 125 may be formed by printing a white diffusion material (such as TiO2, BaSO4, or a combination of the same) on a surface of the second light source plate 120. The partial transmission patterns 125 having the above transmittance characteristics can be formed more easily using the above material. The method of forming the partial transmission patterns 125 is not limited to the above example. In another exemplary embodiment of the invention, the partial transmission patterns 125 may be formed using various methods. In one exemplary embodiment, the partial transmission patterns 125 may be formed by a laser process or an etching process.

The first and second light source plates 130 and 120, which are disposed on and overlapping the light source substrate 140, can uniformly deliver light emitted from the light sources 145 to the display panel assembly 30 without reducing the luminance of the light. Specifically, in the illustrated exemplary embodiment, the partial transmission patterns 125 disposed on the second light source plate 120 may allow a portion of light emitted from the light sources 145 to pass therethrough, while returning the other portion of the light to the first light source plate 130.

Here, a portion of the light returned to the first light source plate 130 from the second light source plate 120 may be guided to the display panel assembly 30 by the diffusion patterns 137 of the first light source plate 130, and the difference in refractive indices of the first and second light source plates 130 and 120. In addition, a remaining portion of the light returned to the first light source plate 130 from the second light source plate 120 may travel a predetermined distance toward a side surface of the first light source plate 130 and then proceed to the display panel assembly 30. That is, light emitted from the light sources 145 of the light source substrate 140 may be converted into surface light and then may be delivered accordingly to the display panel assembly 30. As a result, luminance uniformity can be improved.

In the illustrated exemplary embodiment, the apertures 135, in which the light sources 145 are housed, are shaped like cylinders that penetrate the first light source plate 130. When the aperture 135 are shaped like cylinders, a higher coupling ratio can be achieved, in contrast to when portions of a light guide plate (corresponding to the first light source plate 130 of the invention), in which light sources are housed, are shaped like lenses. Accordingly, light emitted from the light sources 145 can be more effectively converted into surface light.

Here, the coupling ratio refers to a ratio of an amount Ct of light incident upon the first light source plate 130, to an amount C of light emitted from the light sources 145. As the coupling ratio increases, light can be more efficiently converted into surface light. The amount Ct of the light incident upon the first light source plate 130 may include an amount C1 of light directly input to the first light source plate 130 from the light source 145, and an amount C2 of light input to the first light source plate 130 after being reflected by the partial transmission patterns 125 of the second light source plate 120.

As described above, the apertures 135, in which the light sources 145 are housed, are shaped like cylinders penetrating the first light source plate 130. The cylindrical apertures 135 can be formed more simply and stably in contrast to forming lens-shaped portions of a light guide plate in which light sources are housed.

Furthermore, in the illustrated exemplary embodiment, the first and second light source plates 130 and 120 contact each other, excluding their portions corresponding respectively to the apertures 135 and the partial transmission patterns 125. Thus, a higher coupling ratio can be achieved in contrast to when the first and second light source plates 130 and 120 are separated from each other by a predetermined gap.

Since the partial transmission patterns 125 disposed above (e.g. overlapping in the plan view) the light sources 145 not only reflect light emitted from the light sources 145 but also allow part of the light to pass therethrough, areas of the display device above the light sources 145 are not significantly brighter or darker than the other areas. Consequently, luminance stains are not formed, and thus luminance uniformity is enhanced.

The optical sheet 110 is disposed above the first and second light source plates 130 and 120, and diffuses and concentrates light from the first and second light source plates 130 and 120. The optical sheet 110 may include at least one of a diffusion sheet, a prism sheet, a protective sheet, and a reflective polarization sheet. Alternatively, the optical sheet 110 may be a single optical sheet having the functions of the diffusion sheet, the prism sheet, the protective sheet, and the reflective polarization sheet. That is, the optical sheet 110 may include a lower portion having a diffusion function, a prism pattern (not shown) disposed on the lower portion, and a protective layer (not shown) disposed on the prism pattern.

Since the optical sheet 110 is very thin, it may be supported by a base plate 115, and may be disposed accordingly above (e.g., overlapping) the first and second light source plates 130 and 120. In an exemplary embodiment, the base plate 115 may be a transparent plate thicker than the optical sheet 110. The optical sheet 110 and the base plate 115 may be separated a predetermined distance from the first and second light source plates 130 and 120 by a plurality of a support 117, as shown in FIG. 4, so that light emitted from the light sources 145 can be mixed more efficiently or can be provided more uniformly in terms of luminance to the display panel assembly 30. Where the optical sheet 110 and the base plate 115 are separated a predetermined distance from the first and second light source plates 130 and 120, there is an air gap between the optical sheet 110 and the base plate 115, and the first and second light source plates 130 and 120. The air gap enables light emitted from the light sources 145 to be mixed more efficiently or to be provided more uniformly in terms of luminance to the display panel assembly 30.

However, the disposition of the optical sheet 110 and the base plate 115 is not limited to the above exemplary embodiment. In another exemplary embodiment of the invention, the optical sheet 110 and the base plate 115 may each be disposed above the first and second light source plates 130 and 120, with a third light source plate 119 interposed therebetween, as shown in FIG. 5. Specifically, the supports 117 shown in FIG. 4 may be omitted. That is, where the supports 117 are omitted, the first and second light source plates 130 and 120, the third light source plate 119, the base plate 115, and the optical sheet 110 may be sequentially stacked.

The third light source plate 119 may have a thickness that enables light emitted from the light sources 145 to be mixed more efficiently or to be provided more uniformly in terms of luminance to the display panel assembly 30. Since the thickness of the third light source plate 119 may be smaller than the air gap shown in FIG. 4, the entire thickness of the backlight unit 100 can be reduced. Moreover, since the third light source plate 119 supports the entire surface of the optical sheet 110 and the base plate 115, the damage to the optical sheet 110 and the base plate 115 can be reduced, compared in contrast to when the optical sheet 110 and the base plate 115 are supported by the supports 117 only in point locations of FIG. 4.

The display device of FIGS. 1-5 described above includes one first light source plate 130 and one second light source plate 120. However, the invention is not limited thereto. In another exemplary embodiment of the invention, a display device, in particular, a large display device may include a plurality of the first and second light source plates, which respectively include two or more first and/or second sub-light source plates.

Figure 6:
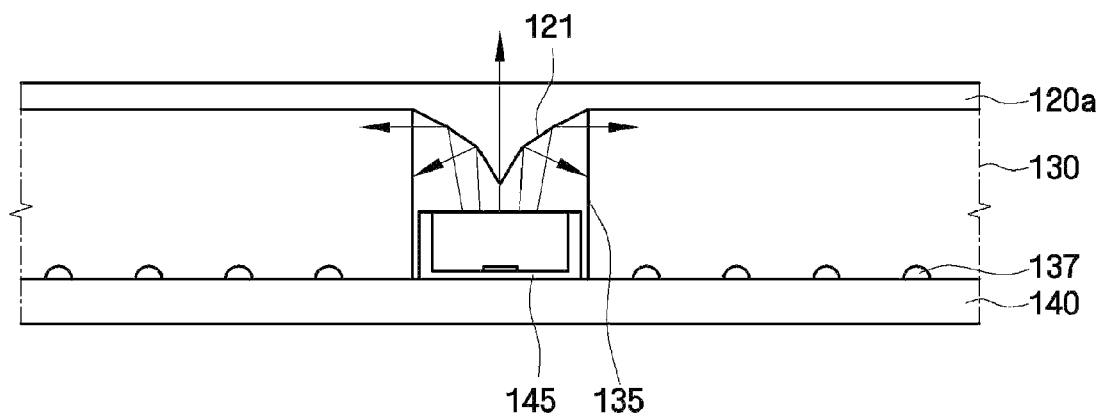
FIG. 6 is a cross-sectional view of another exemplary embodiment of a backlight unit, according to the invention.

FIG. 6 is a cross-sectional view of another exemplary embodiment of a backlight unit, according to the invention.

Referring to FIGS. 3 and 6, unlike the second light source plate 120 in FIGS. 1-5, a second light source plate 120a according to the illustrated exemplary embodiment includes a plurality of a protrusion 121. The protrusion 121 may function as the partial transmission pattern 125 of FIG. 3. The protrusion 121 and a plate portion of the second light source plate 120a, collectively form the single unitary indivisible second light source plate 120a.

Specifically, the second light source plate 120a according to the illustrated exemplary embodiment is disposed on and overlapping an upper surface of a first light source plate 130, and includes a plurality of the protrusion 121 which corresponds respectively to a plurality of apertures 135 of the first light source plate 130. Each of the protrusion 121 may be disposed protruding from a bottom surface of the second light source plate 120a and extending outwards to an exterior of the second light source plate 120a.

In a plan view, each of the protrusions 121 includes a center and a boundary (e.g., edges). The center of each of the protrusions 121 protrudes further towards the light source substrate 140 than the edges thereof. The protrusions 121 may allow a portion of light emitted from light sources 145 to pass therethrough while reflecting the other portion of the light. That is, in the illustrated exemplary embodiment, the protrusions 121 integrally disposed on the second light source plate 120a may be substantially the same as the partial transmission patterns 125 of FIG. 3.

The center of the protrusion 121 may be substantially aligned with a central axis of the light source 145. Even when an intensity of light emitted in a direction of a central axis of the light sources 145, is higher than that of light emitted in a direction of an off-central axis of the light sources 145, the protrusions 121 can more effectively reduce or effectively prevent an increase in luminance in the direction of the central axis of the light sources 145.

In FIG. 6, a height of the protrusion 121 taken in a direction perpendicular to the planar portion of the second light source plate 120a, discontinuously increases from the edges thereof in a direction toward a central axis of the protrusion 121. However, the invention is not limited thereto. In an alternative exemplary embodiment of the invention, the protrusion 121 may have various shapes. In one exemplary embodiment, the protrusion 121 may be substantially cone-shaped or dome-shaped.

Figure 7:
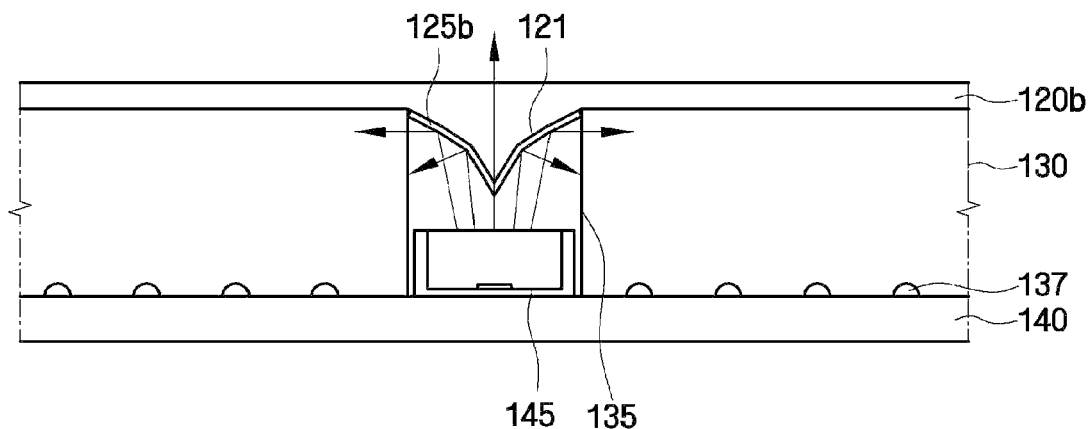
FIG. 7 is a cross-sectional view of another exemplary embodiment of a backlight unit, according to the invention.

FIG. 7 is a cross-sectional view of another exemplary embodiment of a backlight unit, according to the invention.

Referring to FIGS. 6 and 7, unlike the second light source plate 120 according to the previous exemplary embodiment of FIG. 6, a second light source plate 120b according to the illustrated exemplary embodiment may include a plurality of a protrusion 121 on which a partial transmission pattern 125b is disposed, respectively.

Specifically, the second light source plate 120b according to the illustrated exemplary embodiment is disposed on an upper surface of a first light source plate 130, and includes a plurality of the protrusion 121 which correspond respectively to a plurality of apertures 135 of the first light source plate 130. In addition, a plurality of the partial transmission pattern 125b is disposed on the protrusions 121, respectively. The partial transmission pattern 125b is disposed between the light source 145 and the protrusion 121. Accordingly, the protrusions 121 and the partial transmission patterns 125b may allow a portion of light emitted from light sources 145 to pass therethrough, while reflecting the other portion of the light. Here, a center of each of the protrusions 121 may protrude further than edges thereof, and the partial transmission patterns 125b may include a material, such as $TiO_2$ or $BaSO_4$, on the protrusions 121, respectively.

Hereinafter, the variation in the coupling ratio, according to a ratio of the height of apertures to the radius thereof, will be described in detail with reference to FIGS. 8A through 9.

Figure 8A:
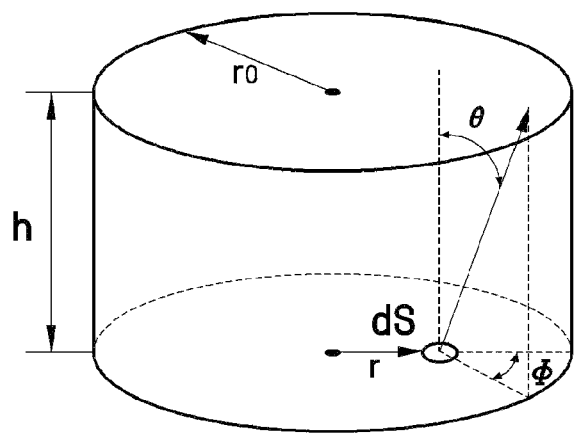
FIGS. 8A through 9 are diagrams for explaining exemplary embodiments of a variation in a coupling ratio, according to a ratio of a height of apertures to a radius thereof.
Figure 8B:
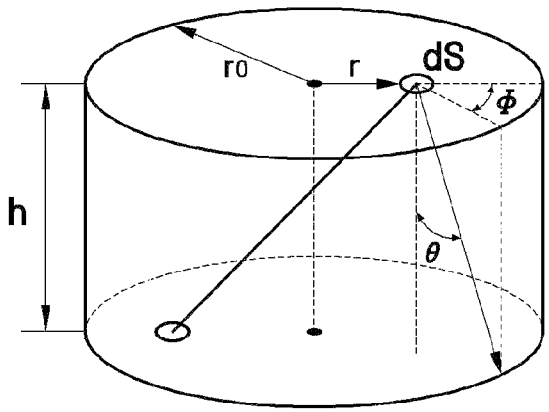
Figure 9:
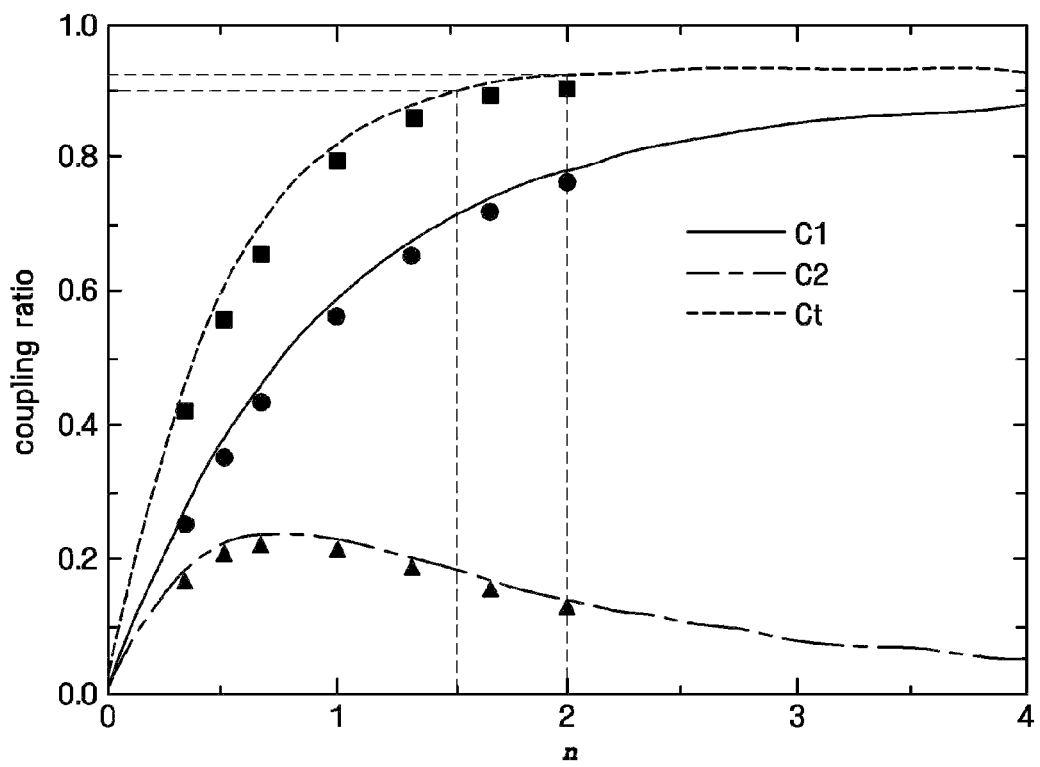

FIGS. 8A through 9 are diagrams for explaining the variation in the coupling ratio according to a ratio $\eta$ of a height $h$ of apertures to a radius $r0$ thereof.

First, the coupling ratio of light incident upon a first light source plate to light emitted from light sources was theoretically calculated by varying the radius $r0$ and the height $h$ of the aperture disposed in the first light source plate. Specifically, of the light emitted from the light sources, an amount $C1$ of light directly input to the first light source plate and an amount $C2$ of light input to the first light source plate after being reflected by a partial transmission pattern were calculated using a model illustrated in FIGS. 8A and 8B. Here, $C1$ and $C2$ may be given by Equations (1) and (2) below.

$$C_1 = \int_0^1 d\kappa \frac{2\kappa}{\pi^2} \int_0^\pi d\phi \frac{1}{\left(1 + \mu^2\left(\sqrt{1-\kappa^2\sin^2(\phi)} - \kappa\cos(\phi)\right)^2\right)} \quad (1)$$

$$C_2 = \frac{2}{\pi} \int_0^1 \kappa d\kappa I_0(\kappa, \mu) \int_0^\pi d\phi \frac{1}{\left(1 + \mu^2\left(\sqrt{1-\kappa^2\sin^2(\phi)} - \kappa\cos(\phi)\right)^2\right)}, \quad (2)$$

where $\kappa = r/r0$, and $\eta = h/r0$

The coupling ratio calculated based on $\eta$ by using Equations (1) and (2) and optical simulation results using the model illustrated in FIGS. 8A and 8B are provided in FIG. 9. In FIG. 9, a solid line, an alternate long and short dash line, and a dotted line respectively indicate C1, C2, and Ct (=C1+C2) calculated using Equations (1) and (2). In addition, dots ●, ▲ and ■ respectively indicate C1, C2, and Ct obtained by optical simulation.

Referring to FIG. 9, a coupling ratio of approximately 90% is obtained when the ratio $\eta$, of the height h of the apertures to the radius r0 of the apertures is 1.5 or higher. In addition, the ratio $\eta$ of 2.0 or higher results in a saturated coupling ratio. That is, the ratio $\eta$ of the height h of the apertures to the radius r0 thereof should be 1.5 or higher, preferably, 2.0 or higher in order to provide more uniform light to a display panel assembly through the first light source plate having the cylindrical apertures.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A backlight unit comprising:
a light source substrate on which a light source is mounted;
a first light source plate which is disposed on the light source substrate, and comprises a cylindrical aperture aligned with the light source; and
a second light source plate which is disposed on the first light source plate, and comprises a partial transmission pattern on a bottom surface thereof facing the first light source plate,
wherein the partial transmission pattern of the second light source plate is aligned with the aperture of the first light source plate, and allows a portion of light emitted from the light source to pass therethrough.

2. The backlight unit of claim 1, wherein
the aperture of the first light source plate is cylindrical, and
the light source is a light-emitting diode.

3. The backlight unit of claim 2, wherein a ratio of a height of the aperture to a radius of the aperture is 1.5 or higher.

4. The backlight unit of claim 1, wherein
a top surface of the first light source plate contacts the second light source plate, excluding a portion thereof which corresponds to the aperture, and
the partial transmission pattern of the second light source plate overlaps the aperture in a plan view of the first light source plate.

5. The backlight unit of claim 1, wherein the partial transmission pattern is disposed on the second light source plate, and has a transmittance of about 5% to about 10%.

6. The backlight unit of claim 5, wherein the partial transmission pattern includes a white diffusion material.

7. The backlight unit of claim 5, wherein the second light source plate further comprises a protrusion, and the partial transmission pattern is disposed on the protrusion.

8. The backlight unit of claim 1, wherein the partial transmission pattern comprises a protrusion which extends from the bottom surface of the second light source plate toward the aperture.

9. The backlight unit of claim 1, further comprising a diffusion pattern which is disposed in a bottom surface of the first light source plate.

10. The backlight unit of claim 1, further comprising:
an optical sheet which is disposed on the second light source plate; and
a support which is disposed between the second light source plate and the optical sheet, and supports the optical sheet to be separated from the second light source plate.

11. The backlight unit of claim 1, further comprising:
an optical sheet which is disposed on the second light source plate; and
a third light source plate which is disposed between the second light source plate and the optical sheet, and supports the optical sheet.

12. A display device comprising:
a display panel which displays images;
a backlight unit which is disposed under the display panel, and provides light to the display panel,
wherein the backlight unit comprises:
a light source substrate on which a plurality of a light source is mounted;
a first light source plate which is disposed on the light source substrate, and comprises a plurality of a cylindrical aperture aligned respectively with the light sources; and
a second light source plate which is disposed on the first light source plate and comprises a plurality of a partial transmission pattern on a bottom surface thereof,
wherein
the partial transmission patterns align respectively to the apertures and allow a portion of light emitted from the light sources to pass therethrough, and
a top surface of the first light source plate contacts the second light source plate, excluding portions thereof which correspond respectively to the partial transmission patterns respectively aligned with the apertures.

13. The display device of claim 12, wherein the partial transmission patterns are disposed on the second light source plate, and have a transmittance of about 5% to about 10%.

14. The display device of claim 12, wherein the partial transmission patterns of the second light source plate include a white diffusion material.

15. The display device of claim 12, wherein the backlight unit further comprises:
an optical sheet which is disposed on the second light source plate; and
a third light source plate which is disposed between the second light source plate and the optical sheet, and supports the optical sheet.

16. A method of forming a backlight unit, the method comprising:
mounting a light source on a light source substrate;
disposing a first light source plate comprising a cylindrical aperture, wherein the cylindrical aperture of the first light source plate is aligned with the light source of the light source substrate; and disposing a second light source plate comprising a partial transmission pattern on a bottom surface thereof, wherein the partial transmission pattern of the second light source plate is aligned with the cylindrical aperture of the first light source plate, wherein the partial transmission pattern allows a portion of light emitted from the light source to pass therethrough.

17. The method of claim 16, wherein a top surface of the first light source plate contacts the second light source plate, excluding a portion thereof which corresponds to the cylindrical aperture.

18. The method of claim 16, further comprising disposing a diffusion pattern in the first light source plate, the diffusion pattern extending from a bottom surface of the first light source plate, to an interior of the first light source plate.

19. The method of claim 16, further comprising disposing an optical sheet overlapping both the first light source plate and the second light source plate, the optical sheet disposed at a predetermined distance from the first light source plate and the second light source plate.

* * * * *